Oct. 11, 1932.  F. O. MILLAR ET AL  1,881,828
CAR PROPELLER FOR TUNNEL KILNS
Filed March 3, 1930    4 Sheets-Sheet 1

FLOYD O. MILLAR, &
WILLIAM C. DENISON, JR.
INVENTORS

ATTORNEY

Oct. 11, 1932.   F. O. MILLAR ET AL   1,881,828
CAR PROPELLER FOR TUNNEL KILNS
Filed March 3, 1930   4 Sheets-Sheet 2

FLOYD O. MILLAR, &
WILLIAM C. DENISON, JR.
INVENTORS

BY
ATTORNEY

Oct. 11, 1932.   F. O. MILLAR ET AL   1,881,828
CAR PROPELLER FOR TUNNEL KILNS
Filed March 3, 1930   4 Sheets-Sheet 3

FLOYD O. MILLAR, &
WILLIAM C. DENISON, JR.
INVENTORS

BY Edwin P. Corbett
ATTORNEY

Oct. 11, 1932.   F. O. MILLAR ET AL   1,881,828
CAR PROPELLER FOR TUNNEL KILNS
Filed March 3, 1930   4 Sheets-Sheet 4
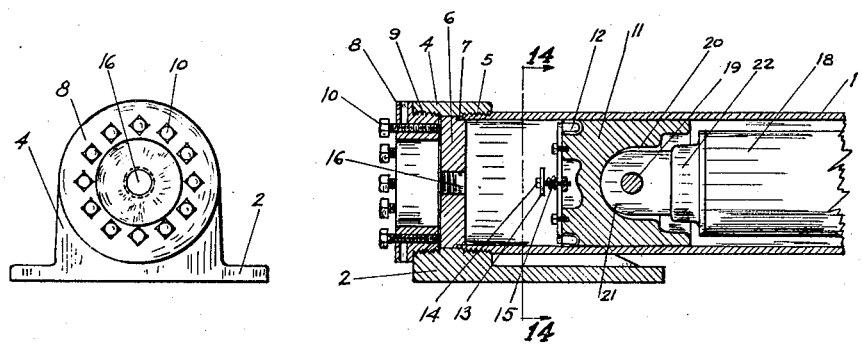
*Fig. 12*   *Fig. 13*
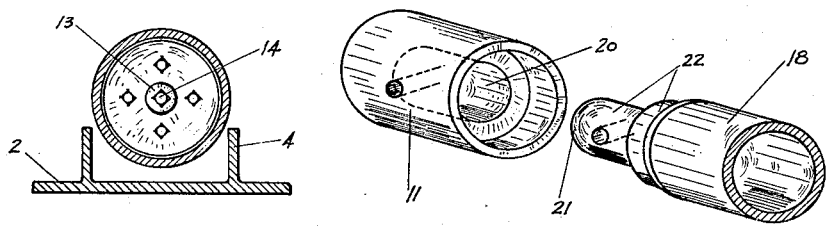
*Fig. 14*   *Fig. 15*
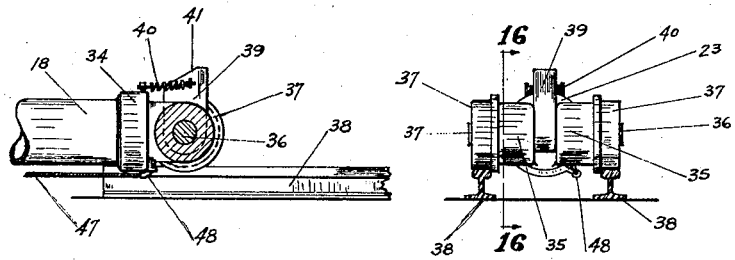
*Fig. 16*   *Fig. 17*
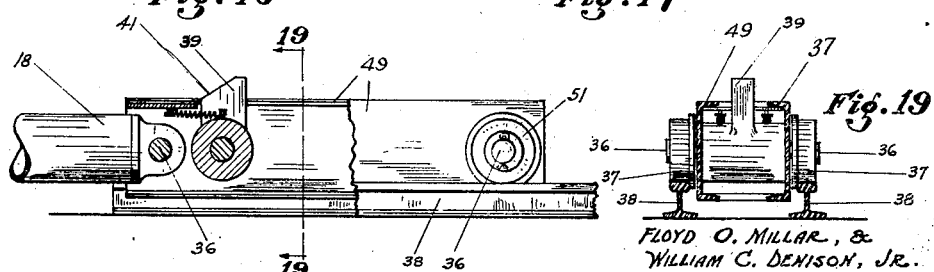
*Fig. 18*   *Fig. 19*
FLOYD O. MILLAR, &
WILLIAM C. DENISON, JR.
INVENTORS
BY Edwin P. Corbett
ATTORNEY Patented Oct. 11, 1932

1,881,828

UNITED STATES PATENT OFFICE

FLOYD O. MILLAR AND WILLIAM C. DENISON, JR., OF COLUMBUS, OHIO; SAID MILLAR ASSIGNOR TO SAID DENISON

CAR PROPELLER FOR TUNNEL KILNS

Application filed March 3, 1930. Serial No. 432,905.

Our invention relates to car propeller for tunnel kilns. It has to do particularly with fluid-operated rams which are designed to propel cars or other transporting elements through a tunnel kiln or, in fact, into or through any type of kiln, furnace or drier wherein such a device might be applicable.

One of the objects of our invention is to provide a fluid-operated ram structure which is readily convertible into either an under-car ram or a vestibule ram. In other words, one purpose of this invention is to provide a ram structure embodying more or less permanent elements which are supplanted by interchangeable elements whereby the ram may be applied to the propulsion of cars either in a vestibule side entrance kiln, furnace or drier, or in an end opening kiln, furnace or drier, in which case it is desirable to have the car or transporting element pass over the propelling mechanism in one direction.

Another object of our invention consists in the provision of a fluid-operated ram which is so formed structurally that it will do the work for which it is intended with maximum ease and with minimum strain upon the ram structure. In this connection, it will appear that there are certain features of our invention which ensure the accomplishment of this result.

Our invention preferably contemplates the provision of a fluid-operated ram structure wherein the cylinder and the rear supporting means therefor are equally adapted for use either with the vestibule, side entrance or end opening kiln, furnace or drier. Likewise, the piston structure which we utilize is substantially identical for either type of service, with the exception of different equipment for the forward end of the piston.

The preferred embodiment of our invention is shown in the accompanying drawings wherein similar characters of reference designate corresponding parts and wherein:

Figure 12 is an end elevation of the rear end of the cylinder for our ram structure.

Figure 13 is a vertical longitudinal section taken through the rear end of our cylinder and piston construction.

Figure 14 is a section taken on line 14—14 of Figure 13.

Figure 15 is an isometric view showing the piston detached from the piston rod and illustrating our ball and socket construction.

Figure 16 is a detail view taken in section on line 16—16 of Figure 17 and illustrating the forward end of our ram structure when equipped with a two wheel support.

Figure 17 is an end elevation looking at the front end of Figure 16.

Figure 18 is a side elevation, partly in section, of the forward end of our piston rod structure when equipped with a four wheel carriage.

Figure 19 is a section taken on line 19—19 of Figure 18.

Figure 1:
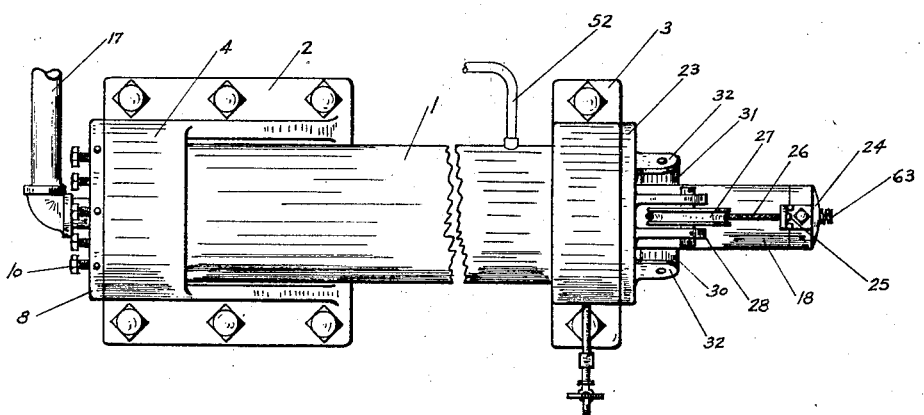
Figure 1 is a plan view of our fluid-operated ram structure equipped to operate upon the end of a car or transporting element, as in a vestibule side entrance kiln, furnace or drier.

In the preferred embodiment of our invention, the cylinder 1 of our ram is preferably carried by a rear pedestal 2 and a front pedestal 3. The rear pedestal 2 preferably carries a sleeve 4 integrally formed thereon adjacent its rearmost end and internally threaded at 5 (see Figure 13) for the reception of the externally threaded rear end of the cylinder 1.

The rear end of the cylinder 1 is closed by a shouldered plug 6 which is forced against a copper gasket 7 that in turn bears against this rear end of the cylinder to effect a fluid-tight contact between the plug shoulder and the cylinder. This will ensure against leakage of fluid past the external thread of the cylinder and also past the threaded connection between the sleeve 4 and a ring-like collar 8 which is used to maintain the shouldered plug in position.

The ring-like collar 8 is externally threaded as at 9 for cooperation with the internal thread upon the sleeve 4, whereby the collar 8 may be screwed into place behind the shouldered plug 6. This collar 8 is provided with a series of set screws 10 which are used to finally force the plug 6 against the copper gasket 7 to ensure fluid-tight sealing.

The steel cylinder 1 is preferably bored and lapped to a finely polished surface and is adapted to receive a piston head 11 which is given a fluid-tight fit within the cylinder by means of a U-shaped gasket 12.

The piston head is also provided with a dash pot plate 13 mounted upon a cap screw 14 in the end of the piston head and resiliently forced rearwardly by means of a coil spring 15. This dash pot plate is designed to cover the opening 16 in the shouldered plug 6 as the piston head approaches its rearmost position to decrease the shock of this return movement, it being understood that the fluid for operating the piston enters and is normally expelled through the opening 16 from the pipe 17.

The piston rod 18 is connected with the piston 11 and has a special complemental construction which protects the connecting pin from undue shearing stresses. The forward face of this piston 11 is provided with a deep concavity 20 which is circular in cross-section and which is adapted to receive the convex portion 21 of a plug 22 which is mounted in the rear end of the pipe which forms the major part of the piston rod 18. This portion 21 of the plug 22 is pivotally connected to the piston by means of the cross pin 19, and there is a substantial clearance between the outer side walls of this portion 21 and the inner walls of the concavity 20.

In this construction, the removable pin 19 takes none of the thrust of the piston rod, since this thrust is taken entirely by the ball and socket formation of the piston concavity and the plug 22.

Furthermore, the clearance just described permits a certain amount of play of the piston rod about its pivotal connection and thereby assists in producing a floating and self-aligning piston construction whose forward end will readily accommodate itself to varying positions and conditions of operation.

Figure 2:
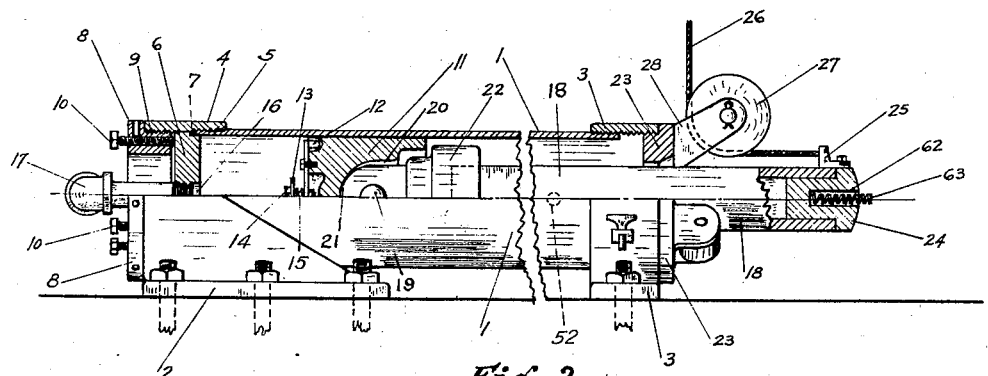
Figure 2 is a side elevation of the structure shown in Figure 1.
Figure 3:
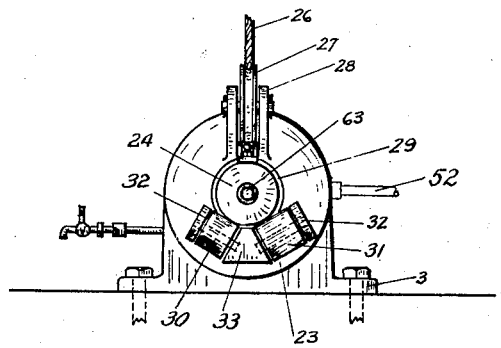
Figure 3 is an end view, looking at the forward end of our ram structure.
Figure 4:
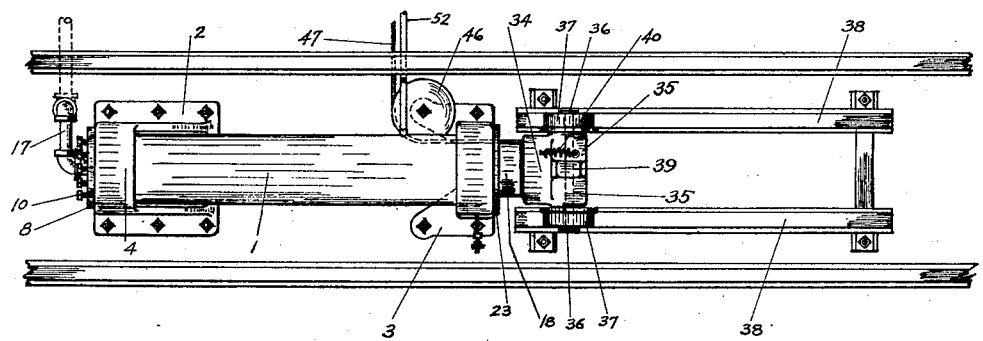
Figure 4 is a plan view of one form of our fluid-operated ram, equipped to operate as an under-car ram, as in an end entrance kiln.
Figure 5:
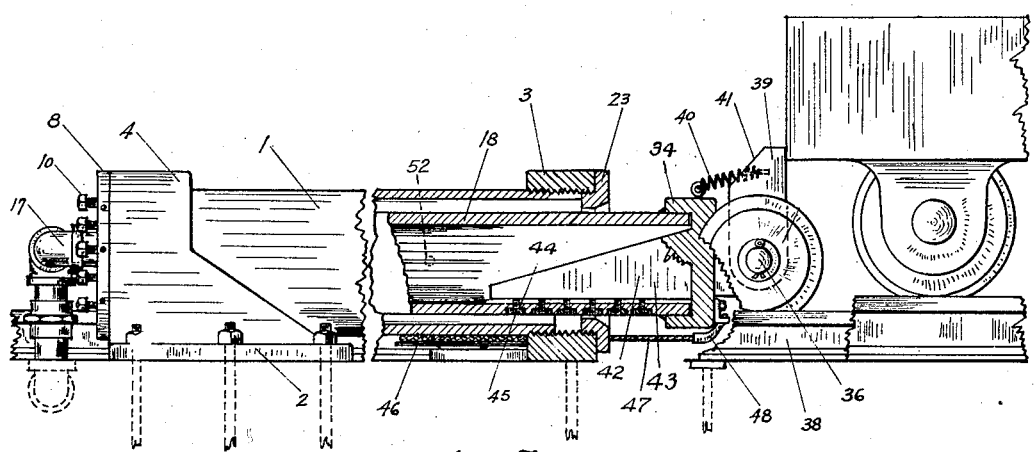
Figure 5 is a side elevation of the structure shown in Figure 4.
Figure 6:
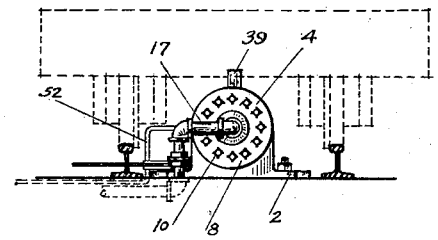
Figure 6 is a rear end view of the structure shown in Figures 4 and 5.
Figure 7:
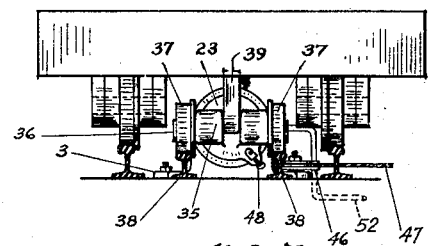
Figure 7 is a front end view of the structure shown in Figures 4 and 5.
Figure 8:
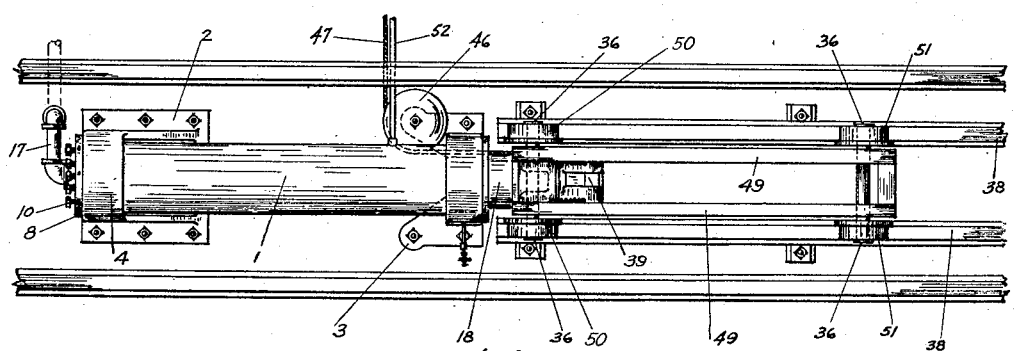
Figure 8 is a plan view of the modified form of our under-car ram.
Figure 9:
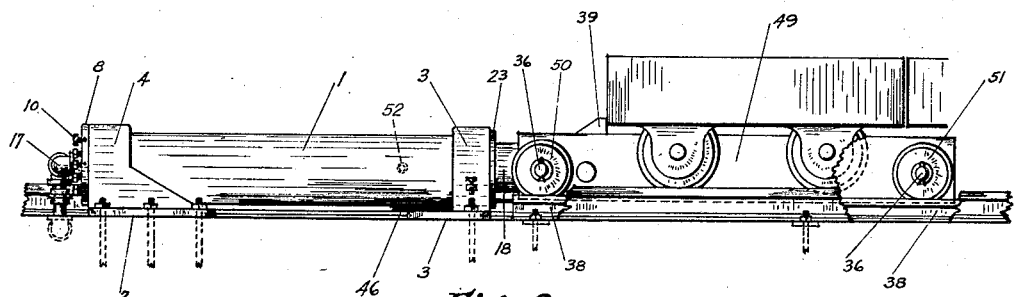
Figure 9 is a side elevation of this modified form of under-car ram.
Figure 10:
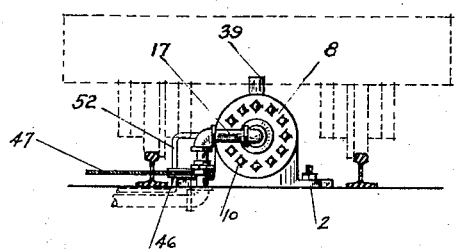
Figure 10 is a rear end view of the structure shown in Figures 8 and 9.
Figure 11:
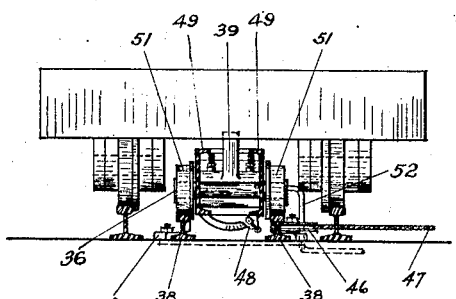
Figure 11 is a front end view of the structure shown in Figures 8 and 9.

When our ram is utilized as a vestibule type of pusher, the pedestal 3 on the forward end thereof (see Figures 1, 2 and 3) is provided with an integral sleeve with a collar 23 threaded into it through which extends the piston rod 18 having its outer end equipped with a nose block 24. This nose block 24 is provided with a bracket 25 to which is connected a cable 26 that extends rearwardly and upwardly around a sheave 27 which is journaled in lugs 28 on the sleeve 23. This cable 26 is utilized for returning the piston to its retracted position at the selected instant.

In this construction of pusher, the forward end of the piston rod extends through the sleeve 23 with a substantial clearance as at 29. It is supported without contact with the walls of the opening in the collar through which it passes by means of a pair of rollers 30 and 31 which are mounted on journals 32 and 33 carried by the sleeve 23. The journal members are so disposed that the rollers 30 and 31 are disposed beneath the horizontal center of the piston and are spaced about thirty degrees on either side of a vertical longitudinal plane through the piston center.

It will be obvious that this manner of supporting the forward end of the piston rod produces a floating piston effect. In other words, the provision of the clearance 29 and the location of the supporting rollers only beneath the piston will serve to cooperate with the ball and socket connection between the piston and the piston rod to permit of all necessary play that may be demanded of the forward end of the piston rod under its conditions of operation.

Furthermore, in the vestibule type of ram, the front end of the plunger is provided with a plug 24 that sets into the pipe and this plug is centrally bored longitudinally as at 62 to form a socket. In this socket, a heavy coil spring 63, made of material which is flat in cross-section, is mounted and projects beyond the front end of the plunger about three-quarters of an inch so as to be the first portion of the plunger which contacts with the car. This avoids shock when the initial impulse is applied to the car. It also stores up power so that the return stroke of the plunger is initiated with a relatively rapid movement.

When our apparatus is designed to operate as an under-car ram (see Figures 4, 5, 6 and 7), the plug member 24 is removed from the forward end of the piston rod 18 and a cap 34 is placed on this forward end of the piston. This cap 34 is provided with integral extensions 35 which are designed to support an axle 36 upon which are mounted wheels 37. Track rails 38 are disposed in parallel relation immediately in advance of the ram cylinder and extending for an adequate distance into the kiln, furnace or drier.

Pivotally mounted upon the axle 36 in between the extension members 35 of the cap is a dog 39 that is normally held upright by a spring 40 (Figure 16). The forward face of this dog is designed to bear against the end of the car or other transporting element. This dog is also provided with an inclined surface 41 on its rear so as to facilitate the forward and downward movement of the dog about its pivot when substantial pressure is applied thereto from the rear. Thus, the dog may be effective as a driving element during forward movement of the piston rod but will be ineffective therefor during rearward movement of the piston and will, in fact, be automatically depressed when substantial pressure is applied to the rear surface.

The fact that the dog 39 is offset from the center line of the piston rod has a tendency to throw an additional strain upon the connection between the cap 34 and the piston rod. We have provided a means to offset this additional strain.

This means preferably takes the form of a wedge-shaped member 42 which is preferably an integral part of the cap 34 and extends for a substantial distance into the pipe which forms the piston rod 18. The under surface 43 of this wedge-shaped member extends along in juxtaposition to the lower wall of this pipe. This lower wall is provided with a plurality of threaded openings 44 for the reception of set screws 45 which may be adjusted and locked into any desired supporting relation to the wedge-shaped member 42. These set screws afford a support for this wedge-shaped member and through such member serve to effectively counteract the strain arising from the offset relation of the dog 39.

In this type of device, the pedestal 3 of the cylinder preferably has a sheave 46 horizontally mounted thereon for cooperation with a cable 47 which is connected to the forward end of the cap 34 as at 48.

A modified form of our under-car pusher is shown in Figures 8, 9, 10, and 11. In this construction, the equipment upon the forward end of the piston rod is substantially the same as the equipment described in connection with Figures 4, 5, 6 and 7, with one main exception, this exception consisting in the fact that the wheels 37 which support the forward end of the piston rod in the construction described are replaced by a carriage 49 having two sets of wheels 50 and 51. This carriage is designed to extend forwardly beneath a car being pushed for the entire length thereof and for a distance beneath the next adjacent car. It affords means for counteracting the strains which result from the offset position of the dog 39.

The operation of our device is extremely simple. It will be understood that the piston and piston rod are intended to be forced outwardly to propel a transporting unit by the introduction of fluid under pressure through the pipe 17 and into the interior of the cylinder. This fluid is preferably a lubricating oil. When the piston reaches its outermost position, as determined by a limit switch provided for this purpose, suitable valves (not shown) are operated to effect stoppage of the outward movement of the piston and to permit return movement of this piston. The cables 26 and 47 are provided with counter weights (not shown) which normally tend to retract the ram piston. Upon the operation of the limit switch, mechanism which is provided for this purpose may be automatically or manually operated to render said counter weights effective to return the piston to its innermost position. If the limit switch fails to work, the uncovering of the safety by-pass 52, by the further outward movement of the piston head, automatically stops further application of pressure to the piston. Where the under-car type of ram is being used, it will be obvious that a car or other carrying member may ride forwardly over the resiliently held dog 39 until this dog assumes a position where it will be effective to propel such car upon outward movement of the piston rod.

It will be obvious that the structure described contains features of advantage which are too numerous to mention but which will be covered in the appended claims. Considered broadly, it will be apparent that we have provided a highly advantageous feature in the fact that our car propeller is readily convertible so that it may be used either as a vestibule type of pusher or as an under-car type of pusher. As previously stated, however, there are numerous other important features of our invention.

Having thus described our invention, what we claim is:

1. A car propeller for kilns comprising a ram of such construction that it may be converted into either a vestibule type or an under-car type of propeller.

2. A car propeller for kilns comprising a cylinder, a piston, and means for mounting said cylinder and piston, said cylinder and piston construction being of such formation that it can be mounted to operate either as a vestibule type pusher or an under-car pusher.

3. A car propeller for kilns comprising a piston, a cylinder, a plug for closing the rear end of said cylinder, a threaded collar for holding said plug in position, and a plurality of set screws carried by said collar and adjustable to apply pressure against said plug.

4. A car propeller for kilns comprising a cylinder, a piston head, and a piston rod so connected to said piston head that its outer end may have some freedom of movement away from the normal axial line of said piston.

5. A car propeller for kilns comprising a cylinder, a piston head, a piston rod related to said head, the forward end of said cylinder having an opening therein through which said piston rod projects, such opening being of sufficient size to permit some freedom of movement of said piston rod away from the longitudinal axis of said piston.

6. A car propeller for kilns comprising a cylinder, a piston, and interchangeable head structures for said piston whereby said propeller may be converted from a vestibule type of pusher to an under-car ram type or vice versa.

7. A car propeller for kilns comprising a cylinder, a piston, and an element mounted on said piston adjacent its forward end and upstanding for contact with a car to be propelled, said upstanding element being resiliently yieldable in one direction.

8. A car propeller for kilns comprising a cylinder, a piston, and a dog pivotally mounted on said piston adjacent its forward end, said dog being resiliently yieldable in one direction.

9. A car propeller for kilns comprising a cylinder, a piston, an offset member on said piston adjacent its forward end, and a member extending rearwardly along within the interior of said piston to counteract strains arising from pressure applied to said offset member.

10. A car propeller for kilns comprising a cylinder, a tubular piston body, a cap for the forward end of said piston body, an offset member on said cap, and a rearward extension on said cap projecting into said tubular piston body and serving to counteract the effect of any pressure applied to said offset member.

11. A car propeller for kilns comprising a cylinder, a piston, an offset member on said piston adjacent its forward end, a member connected to said offset member and extending rearwardly along said piston, and adjustable means between said piston and said member to establish bracing contact between said member and said piston.

12. A car propeller for kilns comprising a cylinder, a piston, an offset member on said piston, and a carriage for supporting the forward end of said piston, said carriage being connected to said offset member and designed to project forwardly beneath a car and in juxtaposition thereto to counteract the effect of strains upon said offset member.

13. A car propeller for kilns comprising a cylinder, a piston, an offset member on said piston, a rearwardly extending member connected to said offset member and a forwardly extending member connected to said offset member, both of said last-named members serving to counteract the effect of stresses upon said offset member.

14. A car propeller for kilns comprising a cylinder, a piston operating in said cylinder and designed to be operated by fluid under pressure and a by-pass port in said cylinder and so located that it will be uncovered to relieve said piston from pressure when it has been projected to a predetermined extent.

15. A car propeller for kilns comprising a cylinder, a piston head having a rounded socket therein, and a piston rod having a rounded end designed to contact with the base of said rounded socket, the side walls of the said socket being flared to permit some freedom of movement of said piston head away from the normal axial line of said piston, and means for securing said piston head within said socket in such a manner that such freedom of movement may occur.

16. A car propeller for kilns comprising a cylinder, a piston, a plug for closing the rear end of said cylinder, an externally threaded collar, said cylinder being internally threaded for cooperation with said threaded collar, and adjustable screws in said collar for exerting pressure upon said plug.

In testimony whereof we hereby affix our signatures.

FLOYD O. MILLAR.
WILLIAM C. DENISON, Jr.